(12) United States Patent
Berends et al.

(10) Patent No.: US 6,276,098 B1
(45) Date of Patent: Aug. 21, 2001

(54) DEVICE FOR SHIELDING A SHED ENTRANCE

(75) Inventors: Jan Berends, Buitenpost; Wybe J. T. Laverman, Beetgumermolen, both of (NL)

(73) Assignee: Stertil B.V. (NL)

( * ) Notice: Subject to any disclaimer, the term of this patent is extended or adjusted under 35 U.S.C. 154(b) by 0 days.

(21) Appl. No.: 09/566,250

(22) Filed: May 5, 2000

Related U.S. Application Data

(63) Continuation of application No. 09/173,078, filed on Oct. 14, 1998.

(30) Foreign Application Priority Data

Oct. 15, 1997 (NL) .................................................. 1007283
Oct. 15, 1997 (NL) .................................................. 1007284

(51) Int. Cl.[7] .................................. E06B 9/06; E06B 7/00
(52) U.S. Cl. ...................... 52/173.2; 49/476.1; 49/475.1; 160/57
(58) Field of Search .......................... 52/173.2; 49/475.1, 49/476.1; 160/57

(56) References Cited

U.S. PATENT DOCUMENTS 3,528,086 * 9/1970 Conger .
4,495,737 * 1/1985 Alten ................................... 52/173.2

FOREIGN PATENT DOCUMENTS

| 3202252 | * 8/1983 | (DE) | ................................... 52/173.2 |
| 0 307 610 | 8/1988 | (EP) . | |
| 0 329 832 | 11/1988 | (EP) . | |
| 2 510 650 | 7/1982 | (FR) . | |
| 2510651 | * 2/1983 | (FR) . | |
| 2105771 | * 8/1983 | (GB) | ................................... 52/173.2 |

* cited by examiner

Primary Examiner—Robert Canfield
(74) Attorney, Agent, or Firm—Mark Zovko

(57) ABSTRACT

The present invention relates to a device for shielding a shed entrance, particularly during loading and/or unloading of a vehicle parked thereagainst, comprising: a wall-mounted frame arranged on an outside wall round the shed entrance; a hanging frame which is held in a plane substantially parallel to that of the wall-mounted frame and at a distance therefrom with resilient separating means; and at lest one fabric element extending at least over the distance between the wall-mounted frame and the hanging frame. The wall-mounted frame and the hanging frame are each formed from at least one hollow profile and at least one open profile, wherein the hollow profile and the open profile form a unit.

18 Claims, 5 Drawing Sheets

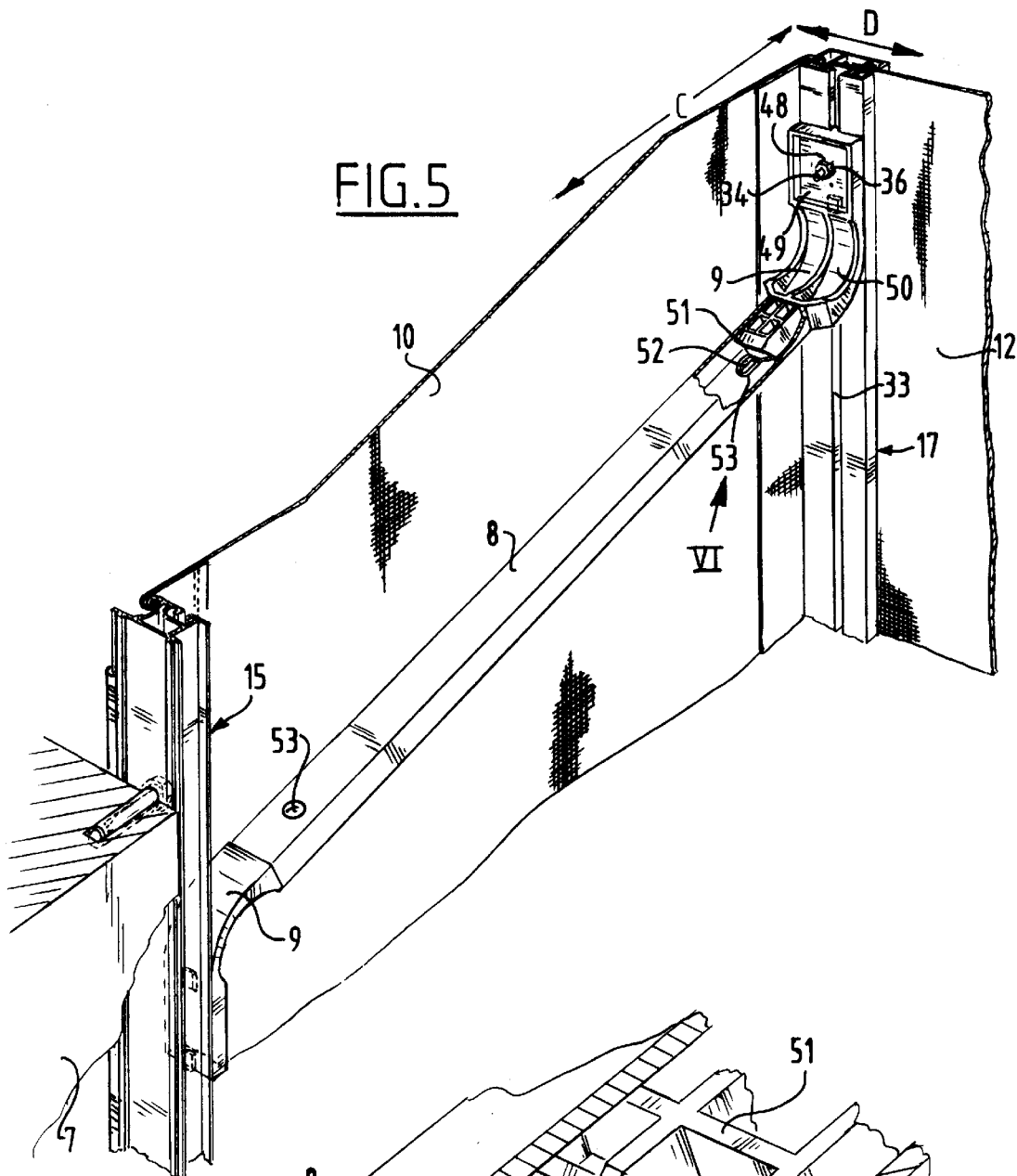
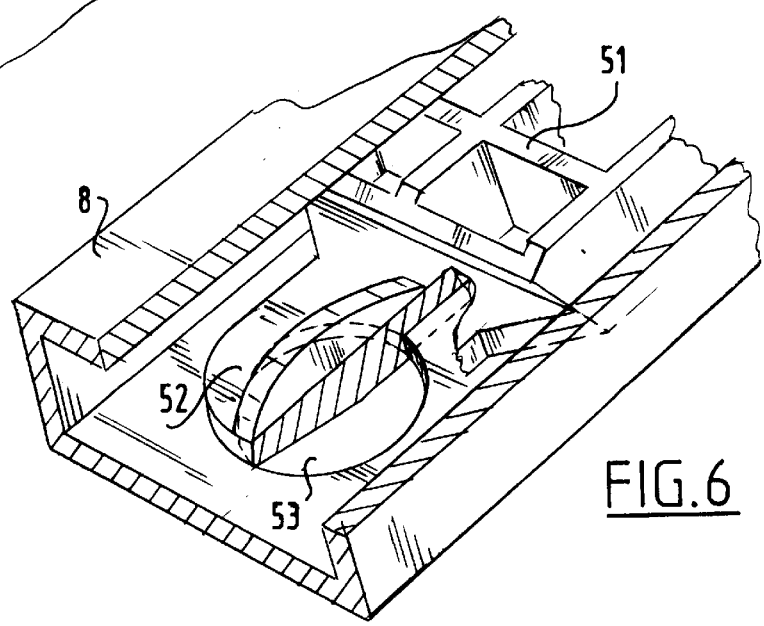

DEVICE FOR SHIELDING A SHED ENTRANCE

CROSS-REFERENCE TO RELATED APPLICATION

This application is a continuation of U.S. Ser. No. 09/173,078 filed Oct. 14, 1998.

BACKGROUND OF THE INVENTION

1. Field of the Invention

The present invention relates to a device for shielding a shed entrance, particularly during loading and/or unloading of a vehicle parked thereagainst, comprising:

- a wall-mounted frame arranged on an outside wall round the shed entrance;
- a hanging frame which is held in a plane substantially parallel to that of the wall-mounted frame and at a distance therefrom with resilient separating means; and
- at least one fabric element extending at least over the distance between the wall-mounted frame and the hanging frame.

2. Description of the Related Art

Such devices are generally known in the art, wherein use is made of large numbers of different profiles and connecting means. As a consequence of this wide diversity of components, the cost price of such known device is high and placing of such a known device is laborious and time consuming. In addition, the wall-mounted frame and the hanging frame are usually manufactured from solid or for instance cast profiles, which are heavy and on which separate connecting means have to be arranged for mutual connection and for arrangement of the fabric element.

BRIEF SUMMARY OF THE INVENTION

The present invention has for its object to provide a device wherein at least the above-stated drawbacks are obviated, and a device is provided for this purpose which is distinguished in that the wall-mounted frame and the hanging frame are each formed from at least one hollow profile and at least one open profile, wherein the hollow profile and the open profile form a unit.

In a device according to the present invention, it is thus possible in simple manner to combine the hollow profile, which serves to provide sturdiness and robustness, with the open profile, which serves to provide space for said connecting means which can engage in the cavity of the open profile, whereby assembly of a device according to the present invention is greatly simplified. As a result of said configuration, use can be made of aluminium, for instance by means of extrusion, whereby a sufficiently sturdy but very light entity is obtained. Uniformity of the profiles of the hanging frame and the wall-mounted frame is moreover increased, whereby the number of components to be used is considerably reduced.

In a preferred embodiment a device according to the present invention has the property that the open profile comprises a C-shaped profile. Access for the connecting means is herein provided in the open part of the C-profile for engagement therein.

Another embodiment of a device according to the present invention has the property that the hollow profile is connected at a distance from the open profile to an additional open profile. In this manner a component forming part of the wall-mounted frame or the hanging frame is provided with measures for connection to at least two other components. The device in this embodiment preferably has the property that the hollow profile and the additional profile form a unit, just as the hollow profile and the initial open profile as already noted above. The simplicity of the components to be used for the device is hereby increased, as is the uniformity. It is also the case here that the frames to be thus formed are manufactured from extrudable profiles of aluminium, at a relatively low cost price, a low weight, a long lifespan and other advantages. Such a device preferably has the property that in cross-section the additional open profile covers more than a semi-circle, the diameter of which is greater than a diameter of a string member around which the fabric element is fixedly arranged, wherein the string member with the fabric element therearound is slidable into the additional open profile. This enables an exceptionally simple assembly which saves time and cost. In preference the string member is herein substantially as long as the additional open profile, so that for each profile of one of the two frames the fabric element as connection therebetween ensures in any case a very simple assembly.

In a further preferred embodiment a device according to the present invention has the property that the additional open profile is flanked by a rainwater discharge arranged toward the outside relative to the fabric element. This applies particularly to the wall-mounted frame, but possibly also for the horizontal profiles of the hanging frame on the top side thereof. Water dripping or trickling downward or forward along the outside wall or possibly along the fabric element is thus prevented from flowing over the fabric element on the top of the device and then still causing inundation of water onto the rear of a vehicle or at the shed entrance. The rainwater discharge is preferably formed by a gutter shape in the material of the hollow profile which extends toward the interior thereof. The rainwater discharge is in this way formed as integral part of the hollow profile, so that it can be designed in simple manner in the extrusion process of for instance aluminium as a unit with the other parts of the profiles for both frames.

Other properties of a device according to the present invention as stated explicitly in the dependent claims will also be further elucidated on the basis of the figure description following hereinbelow.

BRIEF DESCRIPTION OF THE DRAWINGS

In the drawings:

FIG. 5 shows a perspective view of connection of the wall-mounted frame and the hanging frame;

FIG. 6 shows in perspective view a detail of a coupling in the assembled state with a connection as according to FIG. 5.

DETAILED DESCRIPTION OF THE INVENTION

Figure 1:
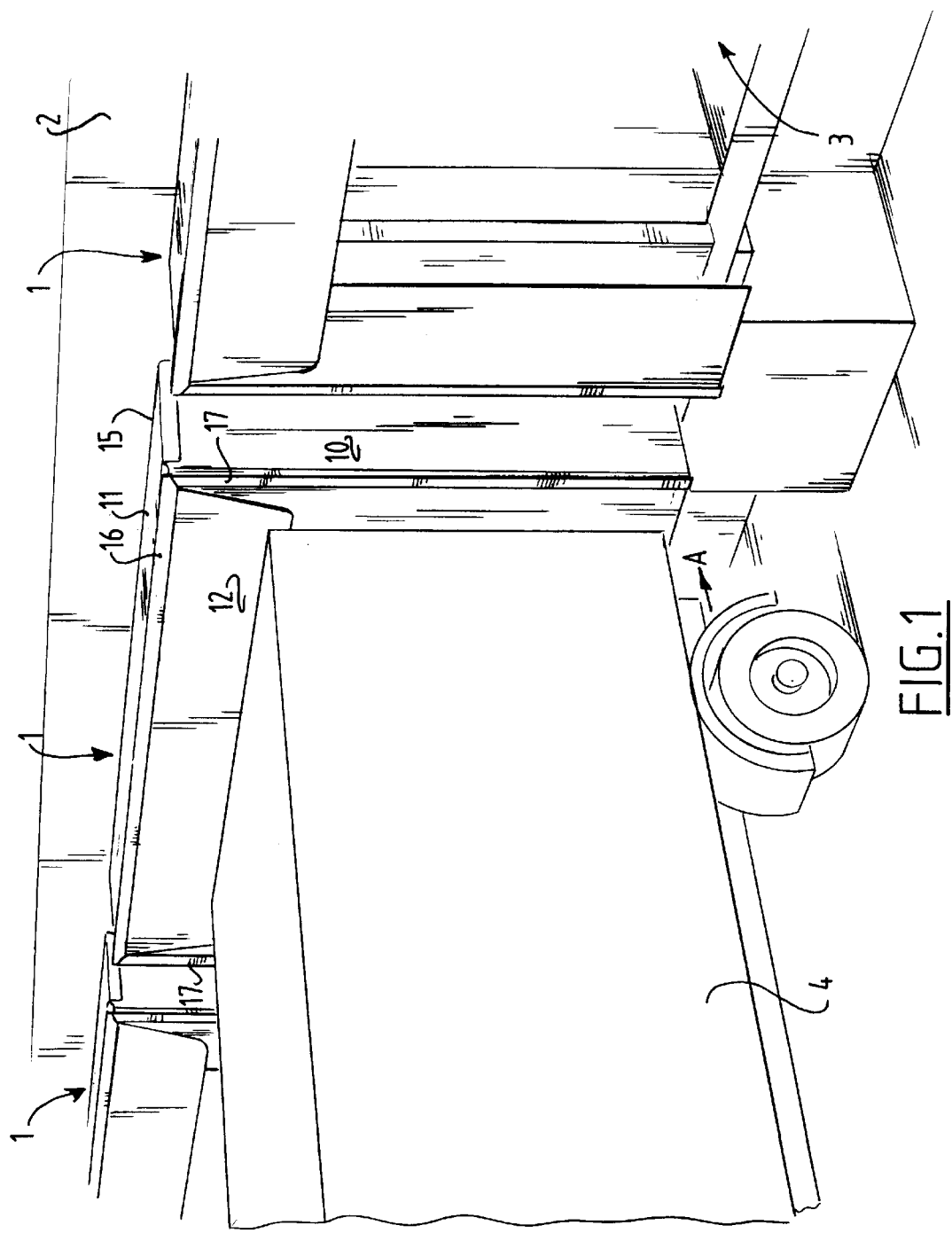
FIG. 1 shows a perspective view of three devices according to present invention.

The view of FIG. 1 shows three devices according to the present invention which are each arranged round an entrance to a shed 2, entrances 3 of which are used for loading and unloading trucks, one such being shown and designated with 4 in these figures. Devices 1 are also known as dock shelters on account of the above described use thereof.

Truck 4 herein drives into the dock shelter in reverse direction to the frontage or wall of shed 2, so that the floor of the entrance 3 of shed 2 and the loading floor of truck 4 lie at practically the same height, which can if required be further leveled using a dock leveler for the purpose of loading and/or unloading truck 4. The travel direction for parking in device 1 is indicated with arrow A. When truck 4 is parked against the wall of the shed 2, the rear of truck 4, entrance 3 and people walking there are protected by device 1 from weather influences such as rain and wind.

The configuration of device 1 according to the present invention will be further described hereinbelow with reference to FIG. 2.

Figure 2:
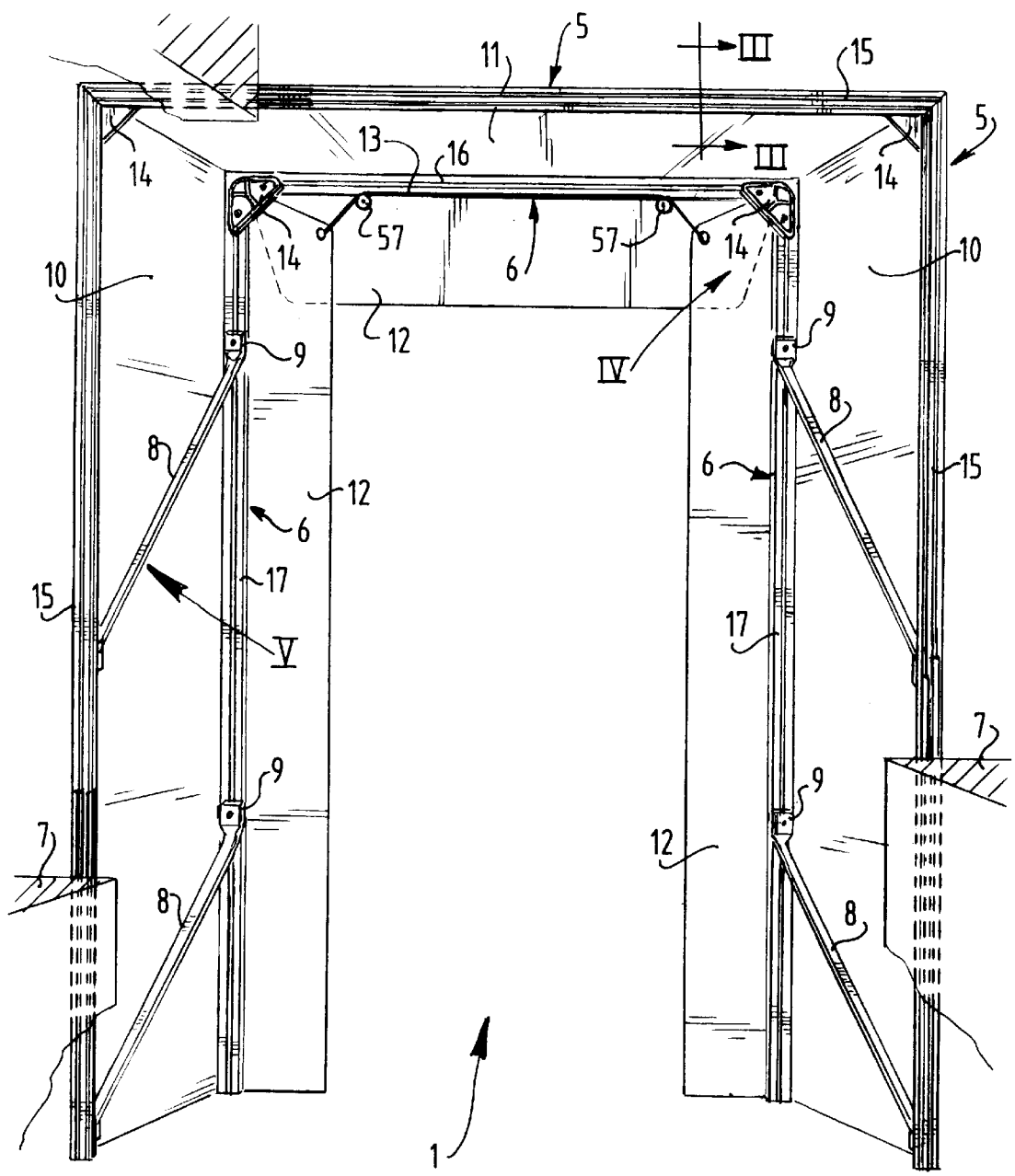
FIG. 2 is a rear view of one of the devices shown in FIG. 1 from the shed, round the entrance of which the device is arranged.

The device 1 shown in perspective view in FIG. 2 comprises a wall-mounted frame 5 which is arranged on the wall 7 around entrance 3 which is shown in FIG. 1 but not in FIG. 2. Placed at a distance from wall-mounted frame 5 is a hanging frame 6 which is held at a distance using rods 8 which function as resilient separating elements. The resilience thereof is obtained with resilient couplings 9, which will be further discussed hereinafter. Rods 8 are each connected to wall-mounted frame 5 as well as to hanging frame 6 by means of the couplings 9.

Also arranged on each side of device 1 between wall-mounted frame 5 and hanging frame 6 is a side fabric 10 and at the top is arranged a top fabric 11. Side fabrics 10 and top fabric 11 are connected on both sides in the width direction thereof to wall-mounted frame 5 and hanging frame 6. Hanging frame 6 is further provided in the front plane, which contains an opening for entry of the truck, with flaps 12 with dimensions such that they fit round the rear part of the entering truck to protect against weather influences. Flaps 12 are suspended by means of a tensioning system with elastic cables 13, this being further elucidated hereinbelow. It is however noted that cables 13 are preferably elastic in order to prevent the flaps 12 hanging downwards at the side and to ensure that flaps 12 remain in a desired starting position.

Side fabrics 10 and top fabric 11 are preferably manufactured from bisonyl and flaps 12 from PVC, for instance with a thickness of about 3 mm, wherein a number of intermediate web layers are incorporated therein. Materials other than those mentioned here can however also be applied for side fabrics 10, top fabric 11 and flaps 12.

The profiles of wall-mounted frame 5 are identical and mutually connected in a reverse U-shaped configuration by means of connecting plates 14. One of these profiles of wall-mounted frame 5 is shown in more detail in FIG. 3 and further described below where this profile is designated with 15.

Figure 4:
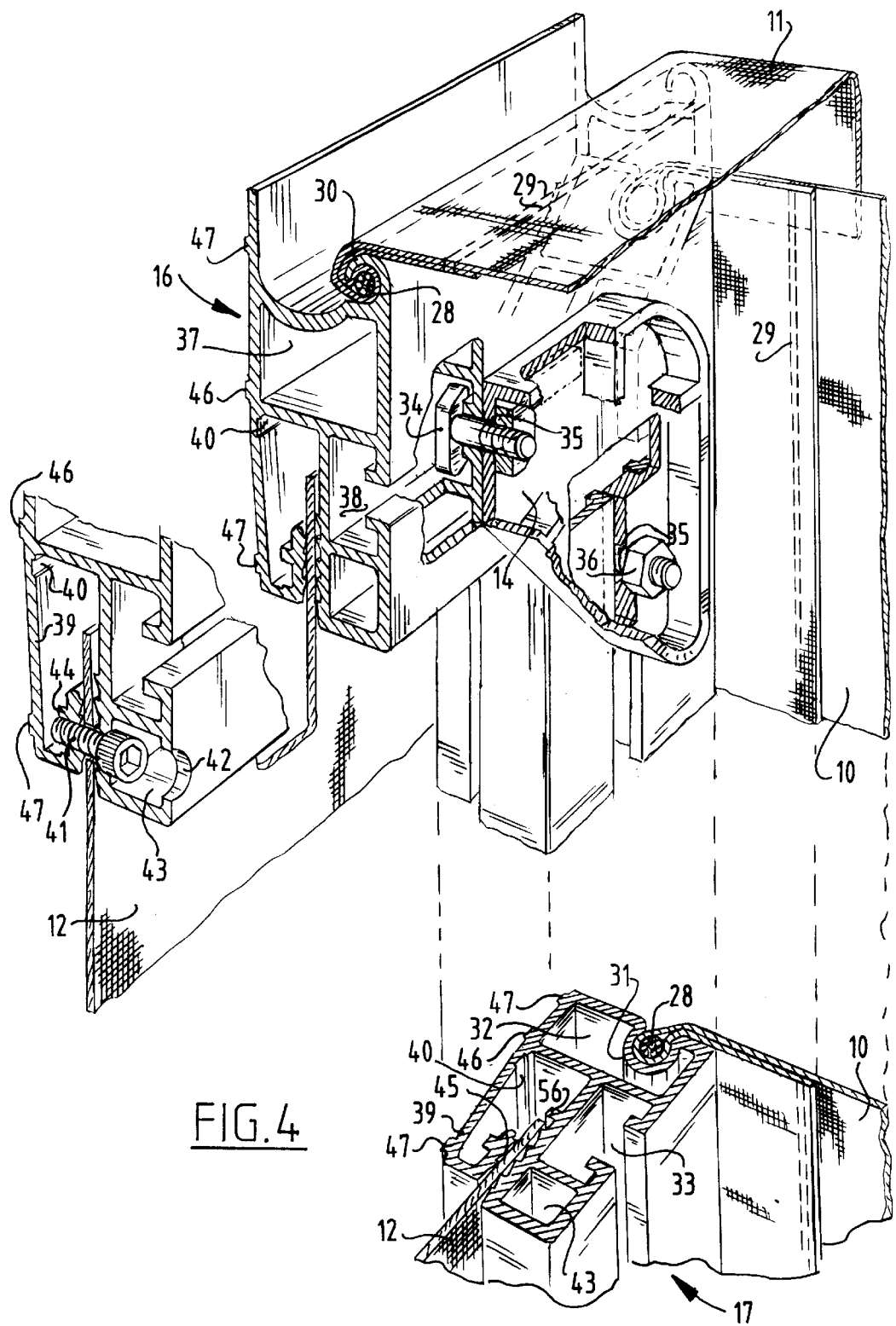
FIG. 4 is a partly cut-away perspective view of components of the hanging frame and fabric elements of a device according to the present invention.

For the hanging frame 6 use is made of two different types of profile, on the one hand the horizontally positioned profile 16 and on the other the vertically positioned profiles 17, wherein each of the vertically positioned profiles 17 is connected at the upper end thereof by means of the connecting plates 14 to one of the outer ends of the horizontally positioned profile 16 so as to obtain in this manner a reverse U-shape and thus hanging frame 6. The configuration of profiles 16, 17 in combination with that of connecting plates 14 and side fabrics 10, top fabric 11 and flaps 12 is shown in FIG. 4 and is described hereinbelow with reference to this FIG. 4.

Figure 3:
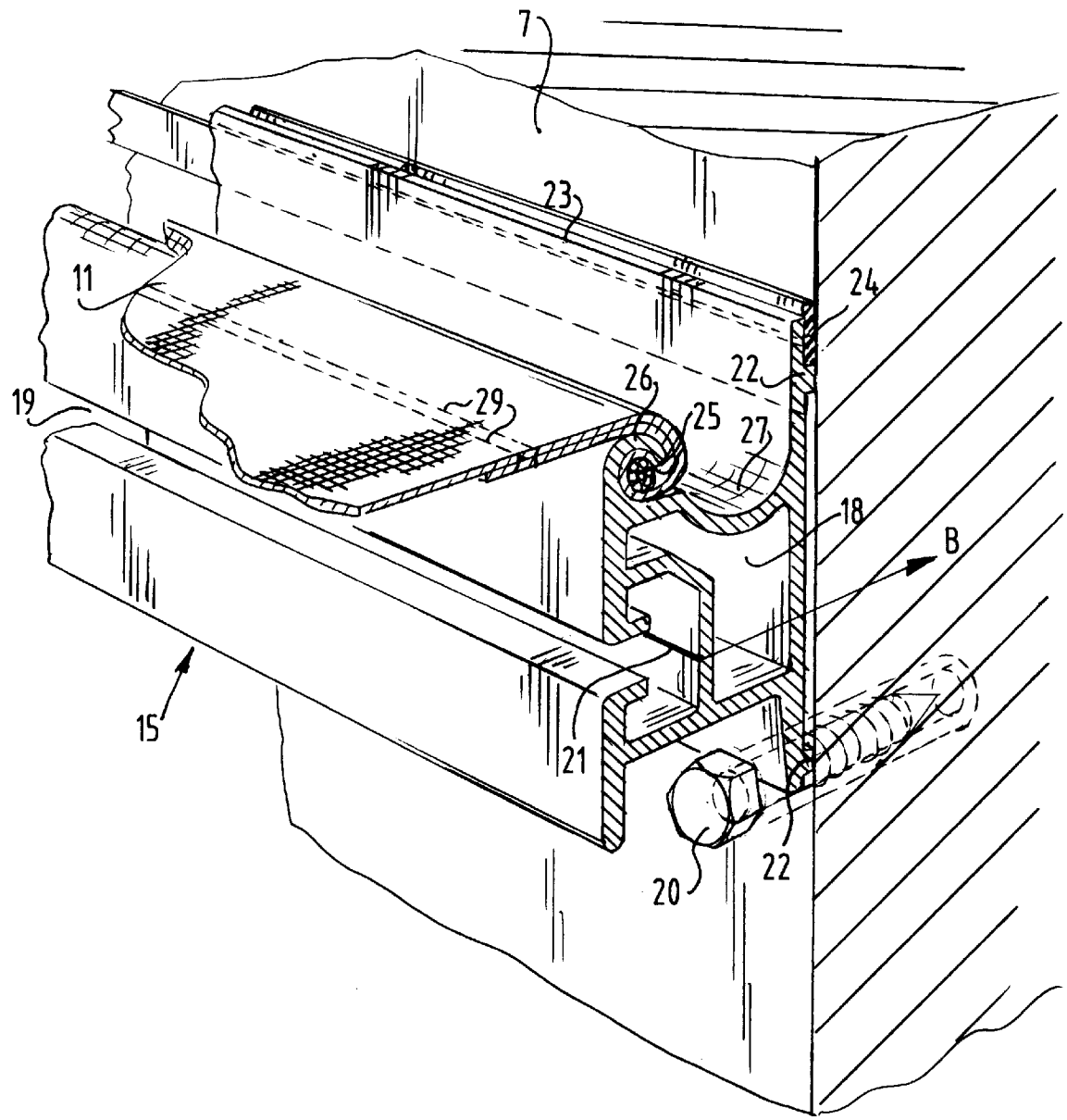
FIG. 3 shows a perspective view of a profile as component of the wall-mounted frame.

FIG. 3 shows a perspective view in cross-section along the line III—III in FIG. 2 of a profile 15 of wall-mounted frame 5. This profile 15 substantially comprises a hollow profile 18 and an open profile 19 which are located mutually adjacently in the outward direction away from wall 7, which direction corresponds with that of top fabric 11. The same also applies for the other legs of the U-shaped wall-mounted frame 5 as shown in FIG. 2, wherein however not the top fabric 11 but the side fabrics 10 determine the orientation of the relevant profile 15. The horizontally running profile 15 shown here is connected on either end thereof to the vertically running profiles 15 of wall-mounted frame 5 using a connecting plate 14 such as is shown in FIG. 2, this in the same manner as profiles 16 and 17 of hanging frame 6, which connection will be further described hereinafter with reference to FIG. 4.

During fitting of a device according to the present invention use is made of bolts 20 which are placed at relatively large mutual distance in wall 7, wherein profile 15 comes to rest thereon as shown in FIG. 3. When the desired positioning of profile 15 has herein been reached, or alternatively prior thereto, holes are drilled through the hollow profile 18, for which purpose a marking 21 is arranged in the open profile 19 on an inner wall thereof so that a drilled hole is accurately centred in relation to the open profile 18. When this marking is used for drilling of the hole, a screw or bolt or other fastening means can be placed therethrough in the direction of arrow B without problems of alignment in order to bring about fixing of profile 15 to the wall 7. Bolts 20 are then superfluous, since they are only useful during mounting of the profile 15.

During mounting of profile 15 it is important that the strips 22 on the rear of profile 15 connect closely to the wall 7 in order to prevent the possibility of rainwater dripping through behind the profile. In order to improve this action, a band of cellular rubber 24 is arranged above the uppermost of the strips 22 between wall 7 and upright edge 23, which extends in upward direction from hollow profile 18, which rubber compresses under the influence of pressure when a fixing is arranged in the direction of arrow B and forms a tight seal against water seeping through behind profile 15. The band of cellular rubber protrudes slightly above upright edge 23 in order to prevent rainwater remaining thereon. This configuration is particularly advantageous in the case of an outside wall 7 displaying some degree of unevenness, which is thus counteracted in effective manner.

Top fabric 11 is folded round a string 25 and in the thus created situation closed along the zone 27, for instance by stitching thereof. Sealing, glueing or adhesion with double-sided tape is also possible. String 25 with the top fabric 11 folded therearound is then pushed into an arm 26 which forms the additional open profile and which in the shown cross-section comprises a part of the circumference of a circle, which circle has at least the same diameter as the dimension of the string 25 with top fabric 11 folded therearound, and wherein the opening equals at least twice the thickness of top fabric 11 and is at most smaller than the dimensions of string 25 with top fabric 11 folded therearound.

It can be seen clearly here that the top side of the hollow profile 18 is provided between arm 26 and the upright edge 24 with an inward curvature which serves as gutter or rainwater drain 27. Thus is ensured that rainwater, which falls for instance along wall 7 or directly onto top fabric 11 or into the gutter or rainwater drain 27 of profile 15, is drained in lateral direction along gutter 27. In contrast to draining of rainwater over top fabric 11 in forward direction relative to wall 7, lateral draining of rainwater through gutter 27 has the advantage that none of the rainwater falling thereon can find its way onto the rear part of the truck parked in device 1 and thus still flow into the shed 2 if the truck 4 parked therein slants slightly to the rear. Top fabric 11 further hangs down in the direction of the hanging frame, whereby rainwater falling thereon is drained in lateral direction by a gutter in the hanging frame such as that designated here with 24.

It is further noted here that arm 26, which forms the additional open profile, is located at a distance from open profile 19, wherein hollow profile 18, open profile 19 and the additional open profile formed by arm 26 form a unit together with upright edge 23 and strips 22, wherein the thus formed profile 15 can be manufactured in relatively simple manner by extrusion of for instance a material such as aluminium, which is particularly suitable because of the low cost price and the workability thereof during extrusion.

The open profile 19 with the marking 21 on the inner wall thereof serves to accommodate therein and conceal from sight the fixing means which have to be arranged through hollow profile 18 in the direction of arrow B. Space is moreover provided in open profile 19 for engagement by engaging means for connection of profile 15 to one of the other components of device 1. Examples hereof are the connecting plates 14. Use can be made for this purpose of for instance hammer-head bolts which can be placed in open profile 19 in a relative position in relation to the opening thereof and which, after rotation through almost a quarter turn, clamp fixedly against the inner walls of open profile 19. The head thereof is then also hidden from sight and only the thread of the hammer-head bolt protrudes out of the opening of open profile 19, wherein arranging of a nut over the screw thread enhances the clamping effect when it is tightened. This is shown for instance in FIG. 4.

FIG. 4 shows a partly broken away perspective view corresponding with arrow IV in FIG. 2. The profiles 16 and 17 shown here are connected respectively to top fabric 11 and one of the side fabrics 10 in the same manner as described with reference to FIG. 3, wherein use is made of strings 28 around which top fabric 11 and one of the side fabrics 10 are respectively folded, wherein these strips are then stitched up along lines 29. Alternatively, these strips can be sealed, glued or adhered with double-sided adhesive tape.

The string 28 associated with profile 16 is pushed in the same manner as shown in FIG. 3 into a space formed by an arm 30 of profile 16 from which the string with top fabric 11 folded therearound cannot be removed other than by sliding in longitudinal direction thereof. Arm 30 has a bend for partial enclosure of a rod-shaped space and thus forms the additional open profile. In contrast, the string 28 associated with profile 17 and having side fabric 10 folded therearound is pushed into a Ω-shaped part 31 of hollow profile 32 of profile 17, wherein here also the string 28 with side fabric 10 folded therearound cannot be removed from this Ω-shaped part 31 other than by sliding in longitudinal direction thereof through this Ω-shaped part 31.

Arranged in profile 17 opposite Ω-shaped part 31 relative to hollow profile 32 is the open profile 33 which is once again suitable for receiving engaging means such as the above described hammer-head bolts. In the embodiment shown here use is made of a hammer-head bolt to effect fixing of profiles 17 and 16 to connecting plate 14. The thread of hammer-head bolts 34 protrudes through the opening of open profile 33 and through holes 35 in connecting plate 14, where nuts 36 are screwed onto hammer-head bolts 34. Open profile 33 enables adjustment of hammer-head bolts 34 and therefore of corner plate 14 relative to profiles 16 and 17. Substantially the same description applies to profile 16 with hollow profile 37 and open profile 38, wherein the thread of hammer-head bolts 34 in open profile 38 protrudes through the opening in open profile 38 and a hole 35 in connecting plate 14 and is there engaged using a nut 36 for tightening the hammer-head bolts in open profile 38 and for mutual fixing of connecting plate 14 and profile 16. The manner in which flaps 12 are arranged on profiles 16 and 17 in the front plane of the device in FIG. 1 and FIG. 2 is substantially the same for both these profiles 16, 17. A single description of this fixing will therefore suffice here and addition will be made where either of the profiles 16, 17 requires separate description.

Profile 16 is provided with clamping means which are located in the proximity of both hollow profile 37 and open profile 38. These clamping means are formed by a leg 39 which is connected to hollow profile 37 close to a recess 40 forming a bending line. For fixing of flaps 12 these latter are arranged between leg 39 and open profile 38. Use is made herein of screws 41 which may or may not be self-tapping, for which purpose a hole 42 is or is not drilled through an additional hollow profile 43 and a part of leg 39, which leg 39 is thickened slightly at 44 round the screw 41 in order to provide this latter with sufficient grip. In this manner screw 41 can be counter-sunk in the additional hollow profile 43 which is arranged on open profile 38 opposite leg 39 relative to flap 12. The leg 39, hollow profile 37, open profile 38 and additional hollow profile 43 herein form a unit and along with screw 41 comprise clamping means. By tightening screw 41 the leg 39 is bent along the bending line formed by recess 40. For optical masking of this effect an additional buffer block 46 is arranged in the proximity of this bending line. Profiles 16 and 17 are otherwise also provided on the front side thereof with buffer blocks 47, the primary function of which is to protect the profiles against a collision with a parking vehicle such as the truck 4 in FIG. 1. Because leg 39 is bent and pulled toward the additional hollow profile 43, flaps 12 are clamped therebetween. In order to increase the grip, the part of leg 39 directed toward flap 12 is provided with an intentionally roughened surface 45 to increase the grip on flap 12. The same applies for the part of the additional hollow profile 43 directed toward flap 12.

Opposite the leg 39 a stop 56 is provided in profile 17 in order to define the depth to which the flap 12 on the side of the device can be placed into this profile.

FIG. 5 shows a perspective view in accordance with arrow V in FIG. 2. Couplings 9 are herein manufactured from resilient material such as POM, or polyoxymethylene, alternatively spring steel. Couplings 9 are here manufactured integrally as injection-mouldable sheet profile. The coupling 9 connected to profile 17 and rod 8 is mounted on a hammer-head bolt 34 which is tensioned in the open profile 33 of profile 17 and fixed there using a nut 36. Coupling 9 contains inter alia a plate 49 with a hole 48 therein, wherein for adjustment of the relative position of coupling 9 in relation to profile 17 use can be made of an adjustment of the hammer-head bolt therefor in hollow profile 33. Connecting onto plate 49 the coupling 9 comprises a curved part 50 with a greater width than the thickness thereof which is connected on the side opposite plate 49 to an insert 51 placed in an outer end of rod 8. Situated on the end of this insert 51 is a hook 52 which, under the influence of a biasing force formed therein beforehand, is pressed into an opening 53 in the relevant rod 8. The snap closure formed in this manner can be broken in simple manner by pressing the hook 52 toward the interior of the relevant rod 8 and subsequently sliding this relevant rod 8 from the coupling 9. The configuration of insert 51, hook 52, opening 53 in combination with the relevant rod 8 is shown in more detail in FIG. 6, as designated with arrow VI in FIG. 5.

Couplings 9 are preferably formed per se such that, apart from the weight hanging from profile 17, a bias force is generated by the relevant rod 8 and the couplings 9 on either ends thereof, whereby the side fabric 10 is stretched tautly. In addition, the rod 8 is long and positioned at a large angle of inclination such that if a vehicle were to collide with the hanging frame, the hanging frame will fold up exactly against the wall-mounted frame.

FIG. 5 shows particularly clearly that couplings 9 are wider than they are thick, whereby flexibility of coupling 9, and therefore the freedom of movement of hanging frame 6 in the direction of arrow D, are markedly less than in the direction of arrow C. Adequate flexibility is hereby provided in the case a vehicle collides with the device, while in the direction transversely of the collision direction of the vehicle (parallel to the wall) a relatively markedly greater rigidity is provided and thereby also a relatively greater resistance to the influence of side wind.

What is claimed is:

1. Device for shielding a shed entrance, particularly during loading and/or unloading of a vehicle parked thereagainst, comprising:
   a wall-mounted frame arranged on an outside wall round the shed entrance; said wall mounted frame fastened to the outside wall with connectors,
   a hanging frame which is held in a plane substantially parallel to that of the wall-mounted frame and at a distance therefrom with resilient separating means; and
   at least one fabric element extending at least over the distance between the wall-mounted frame and the hanging frame, wherein the wall-mounted frame and the hanging frame are each formed from at least one hollow profile said hollow profile providing additional sturdiness to the frame, and at least one open profile, said open profile adapted to accommodate said connectors and, wherein the hollow profile and the open profile form a unit.

2. Device as claimed in claim 1, characterized in that the open profile comprises a C-shaped profile.

3. Device as claimed in claim 1, characterized in that the hollow profile is connected at a distance from the open profile to an additional open profile.

4. Device as claimed in claim 3, characterized in that the hollow profile and the additional open profile form a unit.

5. Device as claimed in claim 3, characterized in that in cross-section the additional open profile covers more than a semi-circle, the diameter of which is greater than a diameter of a string member around which the fabric element is fixedly arranged, wherein the string member with the fabric element therearound is slidable into the additional open profile.

6. Device as claimed in claim 5, characterized in that the string member is substantially as long as the additional open profile.

7. Device as claimed in claim 3, characterized in that the additional open profile is flanked by a rainwater discharge arranged toward the outside relative to the fabric element.

8. Device as claimed in claim 7, characterized in that the rainwater discharge is formed by a gutter shape in the material of the hollow profile which extends toward the interior thereof.

9. Device as claimed in claim 1, characterized in that the hollow profile and the open profile each flank clamping means.

10. Device as claimed in claim 9 characterized in that the clamping means form a unit with the hollow profile and the open profile.

11. Device as claimed in claim 9, characterized in that the clamping means are formed by a resilient leg fixed to the hollow profile and at a distance from the open profile.

12. Device as claimed in claim 11, characterized in that the clamping means comprise actuating members with which the clamping means can be actuated, wherein at least one additional fabric element can hereby be engaged.

13. Device as claimed in claim 11, characterized in that the actuating members engage the leg from the open profile and the additional fabric element is arranged between the open profile and the leg.

14. Device as claimed in claim 1, characterized in that the wall-mounted frame and the hanging frame are formed from at least one profile extruded from a strong material.

15. Device as claimed in claim 14, characterized in that the material is aluminium.

16. Device as claimed in claim 1, characterized in that the wall-mounted frame and the hanging frame are provided with at least one buffer block on the side located opposite the fabric element.

17. Device as claimed in claim 1, characterized in that the wall-mounted frame is mounted on the outside wall via a sealing strip of a watertight material.

18. Device as claimed in claim 17, characterized in that the sealing strip is arranged above the stop member behind the wall-mounted frame and protrudes lightly outside the periphery of the wall-mounted frame.

\* \* \* \* \*